Aug. 14, 1945.　　C. L. EKSERGIAN ET AL　　2,382,554
BRAKE MECHANISM
Filed Dec. 3, 1943　　3 Sheets-Sheet 1

INVENTORS:
Carolus L. Eksergian
Paul W. Gaenssle
BY John P. Bacon
ATTORNEY

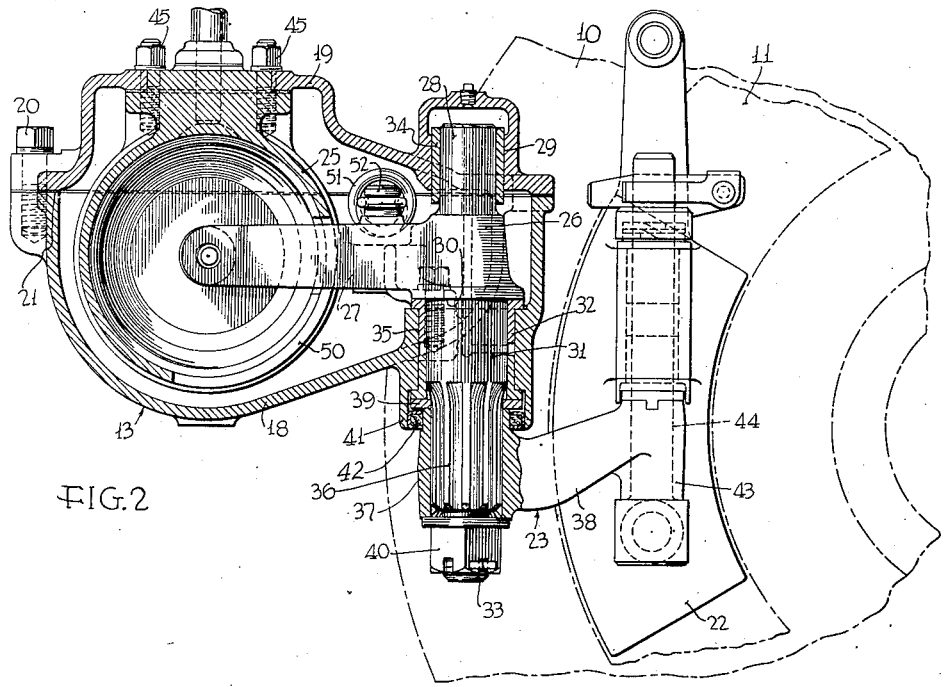

Aug. 14, 1945.   C. L. EKSERGIAN ET AL   2,382,554
BRAKE MECHANISM
Filed Dec. 3, 1943   3 Sheets-Sheet 3
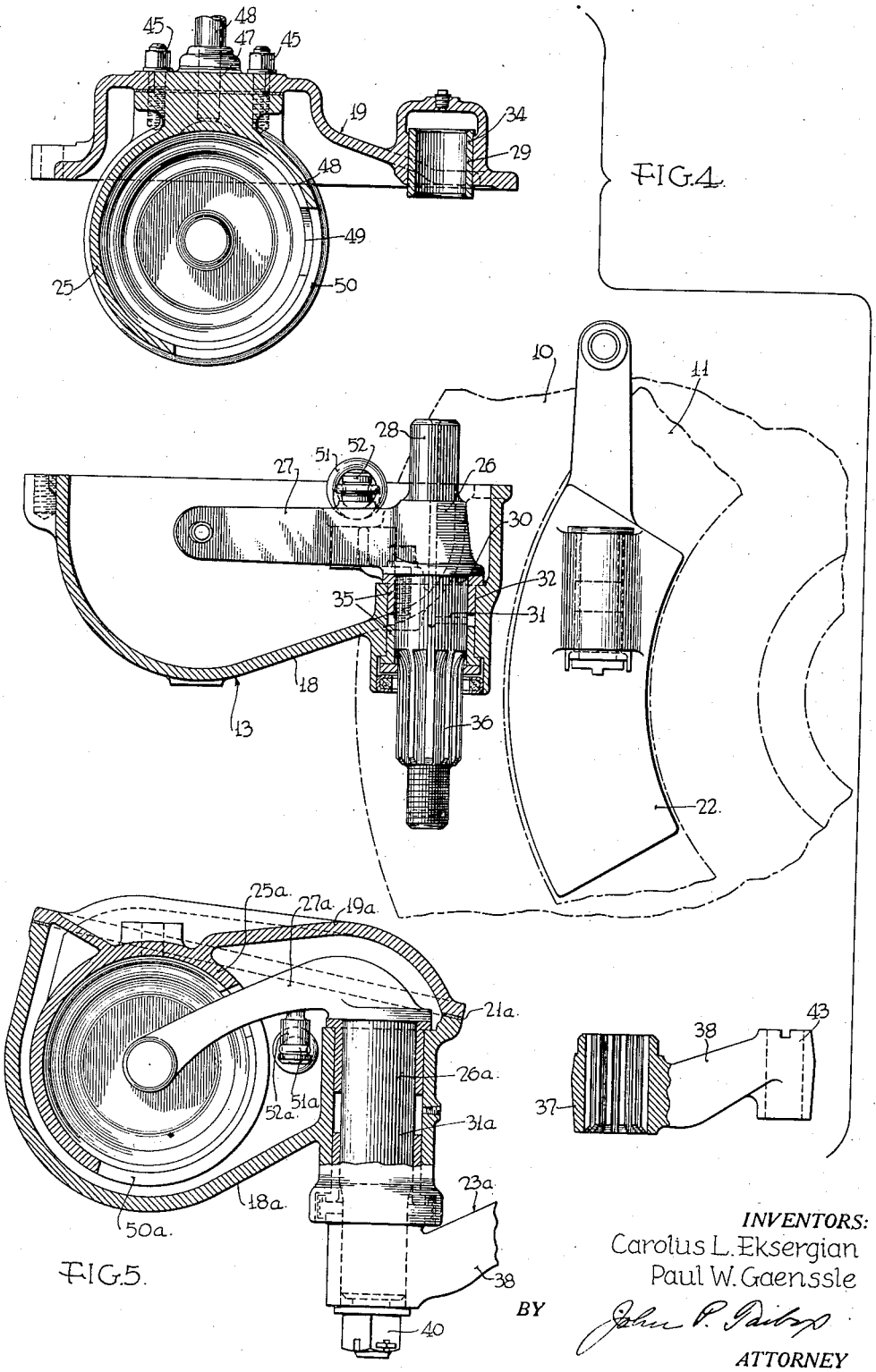
INVENTORS:
Carolus L. Eksergian
Paul W. Gaenssle
BY
ATTORNEY Patented Aug. 14, 1945

2,382,554

UNITED STATES PATENT OFFICE 2,382,554

BRAKE MECHANISM

Carolus L. Eksergian and Paul W. Gaenssle, Detroit, Mich., assignors to Budd Wheel Company, Philadelphia, Pa., a corporation of Pennsylvania Application December 3, 1943, Serial No. 512,728

7 Claims. (Cl. 188—153)

The invention relates to a brake mechanism and more particularly to such mechanism and a support therefor adapted for application to railway vehicles.

In general, the mechanism and its support is of the class disclosed in the co-pending application Serial No. 399,779 for Brake mechanism, filed June 26, 1941, in which the non-rotating members or shoes of the brake mechanism are carried by actuating levers pivoted within a closed casing support housing most of the levers and a cylinder actuator therefor.

It is among the objects of the invention to simplify the construction of such support, and the mechanism associated therewith and to facilitate the manufacture and assembly thereof, and at the same time, to provide a very sturdy construction insuring long life in use and one in which the sealing of the casing against the entrance of dirt or water is facilitated.

These objects are attained in part by constructing a part at least of the support so as to provide a closed casing formed by a lower part and an upper part divided along a plane intersecting the axis of the actuating lever or levers carrying the brake shoe or shoes and in pivotally mounting the actuating lever or levers for the most part in the lower or main body part of the casing, while the upper or cover part of the casing extends over the pivotal portion or portions of the levers and carries an actuating cylinder in cooperative relation with the lever or levers when the casing is assembled.

This relation of parts facilitates the assembly and disassembly of the casing and parts carried thereby and also facilitates the provision of sealed joints between the casing parts and between the lever pivots and the casing.

Ease of assembly and disassembly is in part assured by making each actuating lever of at least two main parts, one a part carrying a pivot portion cooperating with a main bearing in the lower main body part of the casing and having an integral arm extending from the pivot portion within the casing into cooperative relation with the cylinder actuator, and the other, an arm extending on the outside of the casing readily non-rotatably secured to an outward extension of the pivot portion of the first lever part.

The cylinder actuator is so arranged on the cover part of the casing and cut out to receive a portion of the lever arm extending into cooperative relation therewith, as to permit the actuator to be brought into or removed from cooperative relation with the lever arm by simply assembling or disassembling the cover part carrying the actuator with the main casing part.

The casing parts can be readily sealed by a simple sealing gasket disposed in the joint between them and the bearing for the pivotal portion of the lever passes through the bottom of the casing where it can be most readily sealed. The top of the bearing portion is housed within the casing and hence needs no separate seal.

Other and further objects and advantages and the manner in which they are attained will become apparent from the following detailed description when read in connection with the drawings forming a part hereof.

In the drawings:

Figure 2 is a vertical longitudinal sectional view through the brake support taken substantially on the line 2—2 of Figure 1;

Figure 3 is a similar sectional view taken substantially on the line 3—3 of Figure 1;

Figure 4 is an exploded view showing the main parts of the assembly in separated relation; and Figure 5 is a view similar to Figure 2 of a modified form.

Figure 1:
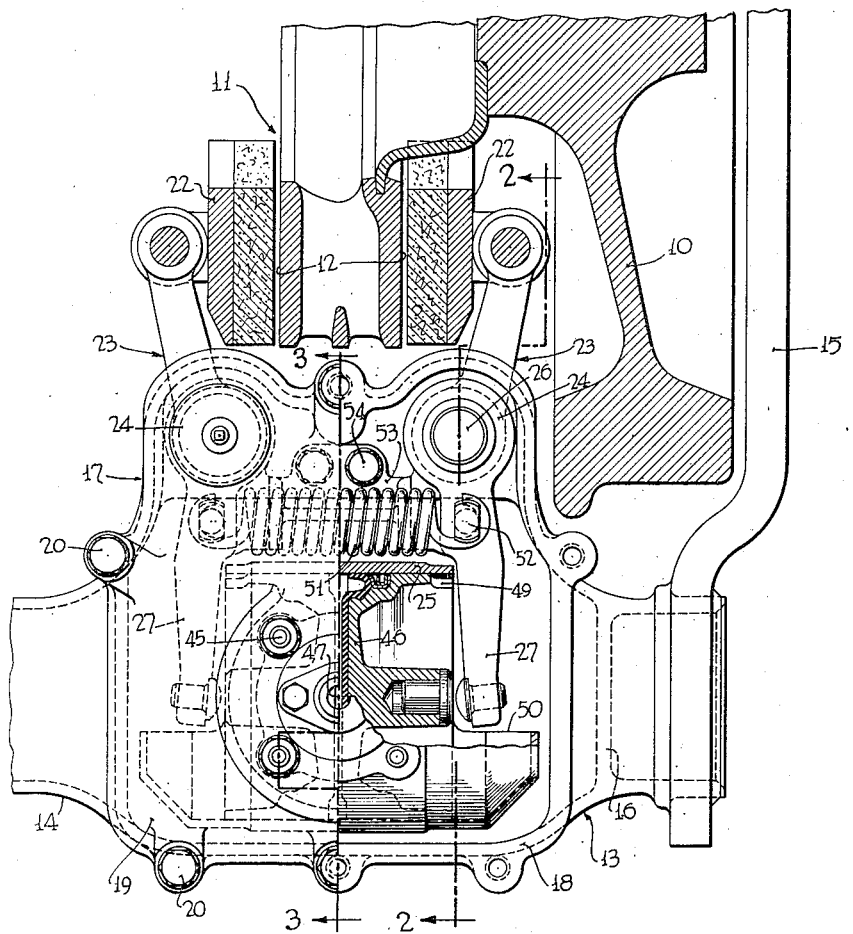
Figure 1 is a fragmentary plan view of the brake mechanism of the invention, showing it in its relation to the wheel of a railway vehicle, parts being broken away and shown in horizontal section.

In the form shown, the invention is applied to a railway truck having the usual frame supported by a wheel and axle assembly, a wheel of which is shown at 10, carrying a brake member or ring 11 rotating therewith, the ring having radial braking faces 12, Figure 1, on the opposite sides thereof.

It will be understood that the opposite wheel of the wheel and axle assembly is similarly provided with a brake ring.

The brake support, designated generally by the reference numeral 13, may comprise a U- or C-frame generally similar in form to that shown in the co-pending application hereinbefore referred to, this U- or C-frame having a transverse extending beam portion 14 supported at three points on the associated railway truck, by having the intermediate portion of the beam portion 14 supported from the truck frame and the opposite lateral ends by longitudinally extending arms, as 15. supported from the ends of the wheel and axle assembly, all in a manner generally similar to that shown in the co-pending application referred to.

It will be evident that the opposite ends of the transverse support beam 14 are similar, and it will be sufficient to an understanding of the invention that the end thereof associated with but one of the wheels, as 10, of the wheel and axle assembly be described.

The transverse supporting beam 14 may be of hollow-tubular construction closed at both ends, as by transverse walls, one of which is indicated at 16. Adjacent a wheel, as 10, the beam support is widened out in longitudinal direction, as indicated at 17, Figure 1, to provide a closed sealed casing housing most of the brake mechanism.

For convenience of construction and assembly of the parts, the casing is split along a substantially horizontal plane with a main body part, designated 18, and a cover part, as 19, these two parts being firmly bolted together in their mating margins, as by spaced bolts 20. The joint so formed is preferably sealed by a sealing gasket, as 21, Figures 2 and 3.

The segmental brake shoes 22, arranged for cooperation with the respective braking faces 12 of the rotary brake member or ring 11, are each supported by a brake lever 23 pivoted at 24, intermediate its ends in the casing 18, 19 and arranged to be actuated by an actuating cylinder 25 mounted within the casing. This arrangement is generally similar to that shown in the earlier co-pending application above referred to.

The actuating levers 23 are constructed and mounted in the casing to facilitate their assembly with the casing, to assure adequate bearings to take the braking force and to facilitate the sealing of the bearings against the entrance of dirt or water.

To this end, each lever comprises a pivot portion 26 having an integral arm 27, extending therefrom intermediate its ends into the casing into position for actuation by the actuator cylinder. At its upper end the pivot portion 26 has a bearing portion 28 fitting a bearing 29 formed in the cover part 19 of the casing and sealed at its outer end by said cover part. This bearing is designed to carry radial thrusts but no axial thrusts. On the side of the arm 27 opposite the bearing portion 28, the pivot portion 26 of the lever is formed with a thrust shoulder 30 and an enlarged bearing portion 31 aligned with the bearing portion 28 and fitting a bearing 32 formed in the main body part 18 of the casing. Both bearings 29 and 32 are provided with hardened bearing linings, respectively, designated 34 and 35. The lining 35 is a two-part lining the opposite ends of which are flanged to provide thrust shoulders.

Extending beyond the bearing portion 31 outside the casing is a splined portion 36 adapted to telescopically receive the mating hub portion 37 of the externally extending arm 38 of the lever, which carries the associated brake shoe 22. The hub 37 is held in place with its inner end engaging a thrust washer 39 bearing against the outer thrust lining sleeve 35, by a nut 40 screwed onto the reduced end of the pivot portion 26 and locked as by a cotter pin 33.

As clearly shown, in Figure 2, the bearing 32 has an annular extension 41 axially overlapping but spaced from the reduced inner end of the hub 37, the space being filled with a suitable annular sealing ring 42.

It will thus be seen that not only does the arrangement of the bearing extending to the outside of the casing at the bottom make it unlikely that water will work into the casing, but this sealed condition is doubly assured by the provision of the sealing ring 42.

The outer end of the arm 38 has a hub portion 43 fitting a pin 44 pivotally mounting the associated brake shoe 22 thereon. The shoe is mounted on the arm so it can be readily dismounted by sliding it upwardly off the pin 44, such mounting being fully disclosed and claimed in co-pending application Serial No. 529,730 filed April 6, 1944 and need not be described herein.

To facilitate the manufacture and assembly of the cylinder actuator 25, it is preferably demountably secured to the cover part 19 of the casing as by the bolts 45. The cylinder wall slidably receives the two actuator pistons 46, one cooperatively arranged with the end of each arm 27 of the respective levers 23. The space between the pistons has an annular channel communicating with a port 47 leading to the outside of the casing and connected to the conduit 48 through which fluid is supplied to force the pistons apart and thereby actuate the brake shoes into braking engagement.

It will be noted that each piston is formed with a slot, as 49, in its skirt, and is normally held against rotation by any suitable means, not shown, the slot avoiding fouling with the adjacent lever arm 27 when the piston moves outwardly.

It will also be noted that each end of the cylinder is cut away, at 50 through approximately 120° of its circumference, this cut away being provided to permit removing the cover part with the cylinder and piston thereon without interference with the lever arm 27.

The arms 27 are normally biased to inoperative position by a coiled tension spring 51 extending between them and connected at its ends, respectively, to a projection 52 on the top of each lever arm. A stop 53 which may be a part removably bolted at 54 to the casing part 18 prevents movement of the lever arms toward each other beyond the position shown in Figure 1.

In the assembly of the parts, the following procedure may be followed. The cover part 19 of the casing is assembled with the cylinder actuator 25 and the bearing sleeve 34 as shown at the top of Figure 4.

The pivot portions 26 of the levers 23 are assembled with the bearings 32 of the main body of the casing as shown in the intermediate view of Figure 4. The coil spring 51 is at this time also assembled with the levers arms 27.

The two casing parts 18 and 19 as subassembled, may now be brought together by lowering the cover part upon the main casing part with the bearing parts 28 and 34 aligned and with the cut out portions 50 of the cylinder actuator aligned with the lever arms 27, respectively, and finally bolting them together through bolts 20 with the sealing gasket 21 between their mating joint parts.

It remains, then, to bring the hub 37 of the outer lever arm 38 into engagement with the splined end 36 of the pivot portion 26 and locking it in place by the nut 40.

It will be understood, of course, that this lever arm 38 might be assembled with the pivot portion 26 before the casing is closed by the bolting of the cover 19 and parts assembled therewith in place.

In Figure 5 is shown a modification in which pivot portion 26a of the lever 23a, instead of having two spaced bearings one in the main body part of the casing designated 18a and the other in the cover part 19a, is mounted through a single elongated bearing portion 31a in a similarly elongated bearing provided solely in the main body part 18a. The arm 27a, cooperating with the cylinder actuator, 25a extends integrally from one end of the bearing portion 31a into the casing. The thrust and radial bearing arrangement is similar to that shown in the preferred form and the external arm 38 is similarly attached to the pivot portion 26a. The cylinder actuator 25a is shown in this form to be integrally formed with the cover 19a, although it is obvious that it may be demountably secured as in the preferred form, if desired. The two parts of the casing 18a and 19a are bolted together along their mating edges in a manner similar to the showing in the preferred form, a sealing gasket 21a being provided to seal the joint.

In this embodiment, the tension spring 51a for retracting the opposed levers, is secured at its ends to downward projections, as 52a, from the respective lever arms, as 27a. This arrangement requires a cut out, as 50a in the cylinder wall extending through a somewhat greater angle, in order that the arms 27a and the cylinder may clear each other in the assembly or disassembly of the cover 19a with attached cylinder actuator 25a.

While the invention has herein been described in several detailed embodiments, it will be understood that changes and modifications may be made by those skilled in the art without departing from the main features of the invention, and such changes and modifications are intended to be covered in the appended claims.

What is claimed is:

1. A brake mechanism comprising a brake support formed in part at least by a closed casing, a brake shoe outside the casing a brake-actuating lever carrying said shoe and supported in a bearing in at least one of the spaced top and bottom walls of said casing and having an arm extending into said casing, a brake cylinder actuator within said casing for actuating said arm, said casing being divided into at least two separable parts, one of said parts carrying the cylinder actuator and extending over said bearing to enclose and seal the same, and being removable as a unit from the other part.

2. A brake mechanism comprising a brake support formed in part at least by a closed casing, a brake-actuating lever supported in bearings at the spaced top and bottom walls of said casing, a brake cylinder actuator for actuating said arm, said casing being divided into separable parts along a generally horizontal plane, one of said parts carrying the cylinder actuator and one of said bearings and being removable as a unit from the other part.

3. A brake mechanism comprising a brake support formed in part at least by a closed casing, a brake-actuating lever pivoted adjacent a vertical wall of the casing through bearings disposed adjacent the spaced top and bottom walls of the casing, said lever having an arm extending from its pivot portion adjacent one of the bearings on the outside of the casing and operatively connected to a brake shoe, said lever having another arm extending into the casing, a piston and cylinder actuator for said actuating lever disposed within the casing and having its piston in operative abutting relation to said last-named arm, said casing being divided into at least two separable parts removably secured together, one of said parts extending over one of the bearings of said lever to enclose and seal said bearing and carrying the cylinder and removable as a unit from the other part carrying the actuating lever.

4. A brake mechanism comprising a brake support formed in part at least by a closed casing, a pair of brake levers pivoted in spaced relation in said casing, each said levers having one arm extending on the outside of the casing for cooperative relation with a brake shoe and another arm extending within the casing, said casing being divided along a plane intersecting the pivot axes of said levers, into two parts, one part carrying said levers and the other part extending over the end of the pivots of said levers to enclose and seal the bearings of said pivots and carrying a brake cylinder actuator, the brake cylinder actuator being adapted to be moved into cooperative relation with the arms of said levers extending within the casing when the two parts of the casing are brought together in assembled relation.

5. A brake mechanism according to claim 4, in which the part of the casing carrying the brake levers is the lower part with the pivot bearings of said levers extending through the bottom wall thereof, and the casing part carrying the cylinder actuator comprises a top cover part extending over the pivot bearings of said levers when assembled with the lower casing part to enclose and seal said bearings.

6. A brake mechanism comprising a brake support including a closed casing divided into upper and lower parts joined by a sealed joint in a plane between the upper and lower walls of the casing, a pair of brake levers pivoted on spaced generally parallel pivots in the lower of said casing parts, each having an arm extending from its pivot outside the casing into cooperative relation with an associated brake shoe and another arm extending from its pivot inside the casing, a spring extending between said last-named arms and tending to move them toward each other, a stop engaging said arms to limit said movement, the upper part of said casing extending over said pivots and carrying a brake cylinder actuator movable between the ends of said lever arms as spaced by said stop in the assembly of said upper part with the lower part whereby to automatically bring the actuator into cooperative relation with the arms in said assembly.

7. A brake mechanism comprising a brake support formed in part at least by a closed casing having spaced vertically extending walls, a pair of brake levers pivoted in spaced relation adjacent one of the vertical walls of said casing, each said levers having one arm extending outside the casing for cooperative relation with a brake shoe and another arm extending inside the casing, a spring for urging the last-named arms of the respective levers toward each other, a stop for limiting the approach movement of said arms under the action of said spring, said casing being divided along a plane intersecting the pivot-axes of said levers, one part carrying said levers, spring and stop and the other part carrying a brake cylinder actuator movable between the inside arms of said levers in cooperative relation therewith for actuating the same upon assembly of said casing parts.

CAROLUS L. EKSERGIAN.
PAUL W. GAENSSLE.